Patented Mar. 29, 1938

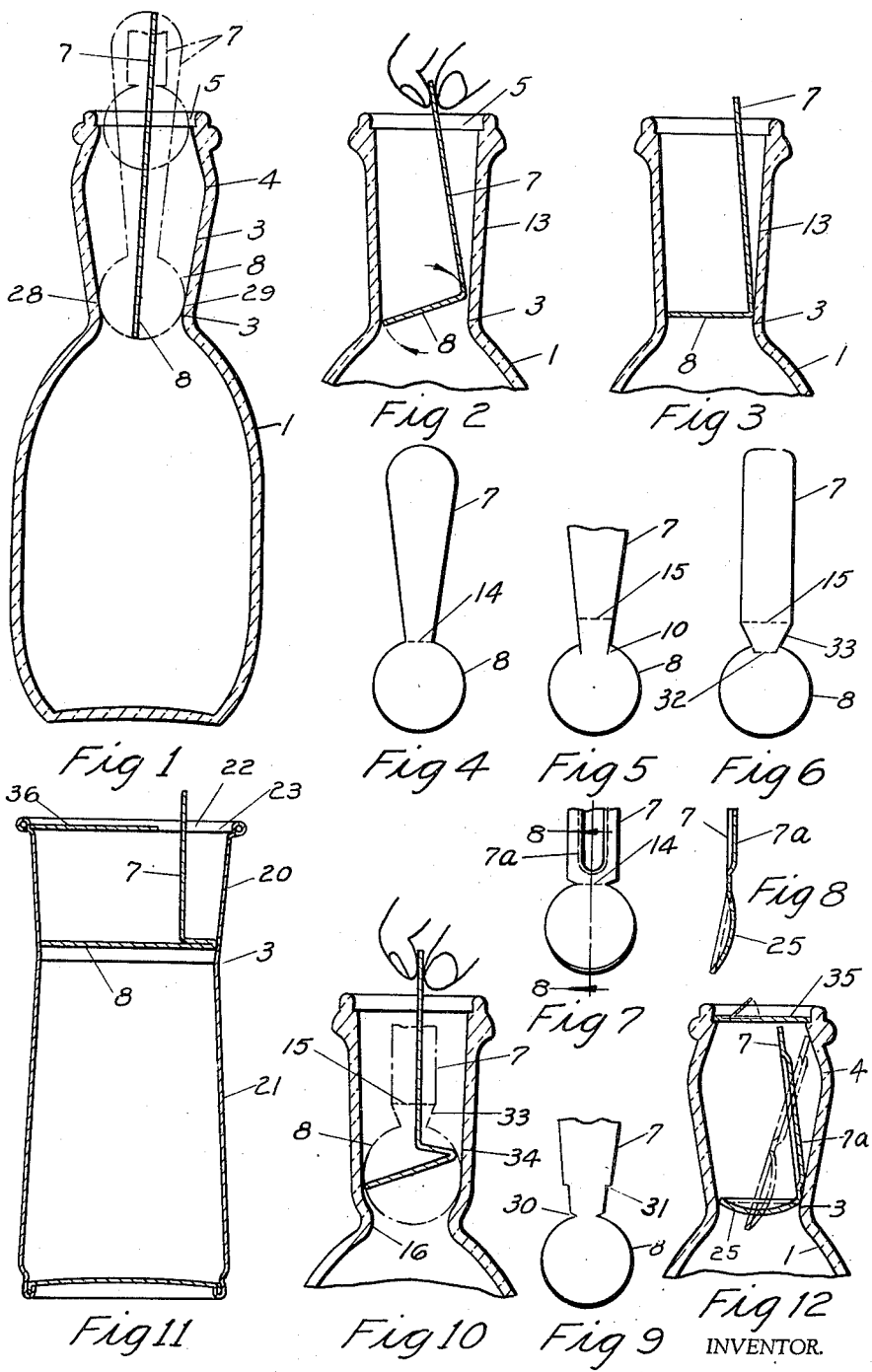
March 29, 1938.  W. C. TEUNISZ  2,112,233
CREAM SEPARATOR AND MILK CONTAINER
Filed Nov. 21, 1936
INVENTOR.
WM. C. TEUNISZ
ATTORNEY.

2,112,233

UNITED STATES PATENT OFFICE 2,112,233

CREAM SEPARATOR AND MILK CONTAINER

William C. Teunisz, Detroit, Mich.

Application November 21, 1936, Serial No. 112,087

6 Claims. (Cl. 210—51.5)

This invention relates to useful improvements in milk containers and cream separators for use therewith, and is a continuation in part in respect to the main subject matter concerning single bend separation of both my applications, Serial No. 760,055, filed December 31, 1934, and Serial No. 54,708, filed December 16, 1935, also continuation in part to the main subject matter of my double bend separator of my application Serial No. 58,656, filed January 11, 1936.

An object of the invention is to provide a combination for removing cream from the top of the milk and maintain milk and cream separately in a container, said combination comprising a container which may be of any suitable material, such as paper or glass formed with an upper cream section and a lower milk section communicating through a restricted throat, the cream section at least immediately above the milk section, being of an inverted cone-like form having a discharge opening at its upper end greater in diameter than said throat, and to provide for use with such container, a separator comprising preferably an integral disc and handle and preferably formed of a single piece of suitable sheet material, as for example, a hard pressed, tough paper or other material or composition of a suitable character which, when provided with a predetermined weakened section, will readily form a bendable joint or hinge at such section either for temporary or permanent use.

The disc is less in diameter than the discharge opening and somewhat greater in diameter than the throat between the two sections. Thus I provide a structure in which, as the approximately flat disc portion and handle are inserted through the discharge opening and through the cream section, the disc at opposite points of its periphery on a diametrical line at right angles to the handle engages the tapered walls of the cream section and by pressure applied on the handle, which is weakened at or about its point of connection with the disc, the disc is caused to turn on the points of contact, with the tapered wall of the cream section, thereby rotating the disc portion and thereby forcing the disc to a peripheral wedging or seated engagement with the wall between the milk and cream sections. The whole structure thus first permits the cream to be poured from the container while restraining the flow of milk.

Another object and feature of the invention is to provide a separator of the general character above stated having a handle weakened at two or more predetermined sections thereby forming bendable joints whereby a longitudinal stress applied to the handle permits the portion between the joints to fold or collapse upon the disc to thereby apply pressure to the disc inwardly of its periphery to position the same in wedging or seated engagement with the tapered wall at the approximate lower end of the cream section.

A still further object is to provide a separator which is adapted to be passed by its handle edgewise, unobstructed and without distortion through the bottle mouth to its functioning relation with the tapered wall of the cream chamber and removed in the same manner, thereby eliminating the possibilities of spilling the cream over the top of the container. This is a decided improvement over either a separator disc of the type which must be distorted to pass through the bottle mouth or over the type which passes in fixed body relationship through the cream.

It is also an object of the invention to adapt a separator to occupy an initial position in a milk bottle upon its delivery, filled and capped, to a customer, and to adapt such separator to be readily manipulated by the customer to its final or separating position.

A further object of the invention is to provide an improved combination whereby milk and cream may be kept separate in a container, as delivered to the consumer, by means of a separator which wedges in operative position and is readily removable by a handle.

These and other objects and the several novel features of the invention are hereinafter more fully described and claimed and the preferred form of a milk container and cream separator for association therewith embodying my invention is shown in the accompanying drawing in which—

Fig. 1 is a sectional elevation of a container showing my improved single bend separator inserted therein to the point of initial engagement with the tapered portion. The separator is further shown in dot and dash lines at 90 degrees to its full line position.

Fig. 2 is a partial section showing the same cream separator in the position assumed just prior to its final positioning at the bottom of the cream section of a modified container.

Fig. 3 is a partial sectional view showing the same cream separator as finally wedged or seated at the approximate bottom of the cream section.

Figs. 4, 5, 6, 7, and 9 are front views showing various modified forms of separators.

Fig. 8 is a sectional view of the form of separator shown in Fig. 7, taken on the line 8—8 of Fig. 7.

Fig. 10 is a partial section of another form of container, showing the double bend separator approaching its operative position.

Fig. 11 is an axial sectional view of another modified form of container, showing the double bend separator in operative position.

Fig. 12 is a fragmentary axial section of a container similar to Fig. 1 and a further modified separator shown therein in two different positions.

The placing of the separator disc in initial contact with the lower portion of cream chamber is shown in Fig. 1, the container therein being of glass or other moldable material adaptable for the purpose and shaped to provide a milk section 1 and a cream section 2. The approximate cream line is indicated slightly below the restricted portion 3 of the neck or below the smallest diameter of the container. The cream chamber is shown as having a wall inclined outwardly toward the container mouth and preferably of a wedging angle, by which I mean an angle which will cause an object to wedge when pushed therebetween, such angle beginning at the top of or slightly above the reduced diameter portion at 3, upwardly and then at 4 is inwardly inclined to provide the usual mouth 5 shouldered to receive the ordinary bottle cap or closure disc 35 (Fig. 12). The diameter of the opening 5 is greater than that of the throat between the cream and milk sections.

It is not material to this invention how the handle is weakened to form the bendable joint or hinge. For example, this may be accomplished by notching, indenting, scoring, perforating, or by any other suitable means. In general, 8 indicates the separator disc and 7 the handle, while 14, 30, and 32 indicate approximately the weakest points of the separators and 15 and 31 indicate the next relatively weak points of the separators.

Fig. 4 illustrates a separator having a handle with considerable taper, forming the least cross-sectional area at a point of intersection with the disc, thereby forming the weakest point in the separator structure from end to end at said intersection.

The separator, however, may be formed as shown in Fig. 5, in which the handle is also tapered as in Fig. 4 except that the handle, at each side of the disc, is slit or slotted into the disc edge at 10, a distance equal to the approximate thickness of the handle. In this form there is also indicated a weakened line at 15.

Fig. 6 shows a slightly modified form of a separator having an abrupt taper 33 between line 15 and 32, the weakest section slightly inside the disc edge at 32 being approximately the thickness of the material whereby when the handle is bent at an angle to the disc, its lower end will be flush with the periphery of the disc. The handle is also shown weakened at 15.

Fig. 7 is a front view and Fig. 8 a central lengthwise section of a form of separator having its disc slightly dished as at 25, and at a slight angle to the handle. The handle is shown straight and embossed, but weakened by notching at 30, to bend at 14.

Fig. 9 is a front view of a separator showing the handle portion between the notches at the disc edge and 31, reduced to a lesser width than the main portion of the handle 7.

Fig. 10 shows a cream section having its lower portion slightly incurved adjacent to the milk section. This view in full lines shows the double bend separator approaching operative engagement with the tapered walls 34 slightly above the incurved wall 16. Dotted lines show the separator at 90 degrees to the sectional view. The incurved annular shoulder 16 prevents the disc where formed of thin material, from being forced into the milk section, by excess manual pressure. The disc however, preferably engages the tapered wall above the seat, when in its proper functional relationship.

The separators in Figs. 5, 6, and 9 are shown provided with the weakest section forming a hinge-like or bendable joint adjacent to the disc and also having a weakened hinge-like or bendable joint, slightly stiffer than the first at a distance from the disc, in no case exceeding one-half the diameter of the disc. Thus, upon applying pressure to the handle, the latter, whether or not engaging a supporting surface, will bend first at the disc, and under further pressure, at the weakened section 15, or 31, until the portion of the handle between the weakened sections folds or collapses on the disc as progressively illustrated in Figs. 10 and 11.

If the separators of Figs. 5, 6, 9, and 10 are to be used for single bend separation, the weakened section 15, or notched portion 31 will be omitted, and where the separators of Figs. 1, 4, and 7 are desired for double bend separation, the added feature of weakening will be added at 15 or 31. The various types of separators described and shown are adaptable to the various types of containers shown, the same results being obtained in all combinations, as each separator functions in an equivalent manner with the tapered or flared wall, and which will be more fully understood from the following:

The handles of the separators are preferably of a sufficient length that same will come flush with or project beyond the receptacle mouth, except in the form of separator shown in Fig. 12, which terminates slightly below the top cap 35.

With the last-mentioned type of separator, the bottle may be first filled with skimmed or whole milk up to approximately 3, after which the separator may be placed in operative position and cream of any desired consistency poured thereabove. Thereafter, the bottle is readily capped for delivery. This combination has the added feature of being positionable in place at the dairy and delivered to the purchaser in a separating position.

The separator shown in Fig. 12 may be delivered to the consumer as above stated, or in the initial position, unbent in a container filled with milk as shown in dash lines. In the latter case, after the cream has risen, the separator is pushed to its operative position after removal of the top cap. The separators herein disclosed are also adaptable to bottles or containers having a definite annular shoulder at the lower cream line as shown in Fig. 10 or of other forms. It is preferred that the separator functions on the taper but should a smaller separator disc be employed it will function directly on the shoulder. The handle, if desired, may be constructed separately and attached to the disc.

The important characteristic of the separator of this invention is that the handle is sufficiently rigid to prevent its bending, except where intended. The portion of the handle predetermined to bend is preferable suitably stiff so the disc may be pushed quite snugly to edgewise engagement with the wall, before the disc is forced to turn or the handle to bend. This is especially desirable where a wedging relation is desired with the wall, whereby further pressure on the handle turns the disc to form a wedged partition, whereafter the cream may be poured off without holding the separator by hand while so doing. The handle, therefore, may be stiffened by embossing as indicated in Fig. 12, or by other means.

The handle 7 is preferably an integral portion of the disc 8 which is of a slightly greater diameter than that of the constricted throat 3 of the container shown in Figs. 1, 2, and 3 or the lower portion of wall 34 in Fig. 10 and is less in diameter than the discharge opening 5, at the mouth of the container. Thus the separator, in its initial approximately flat form, as shown in Fig. 1, may be readily introduced without deformation into the neck of the bottle, as indicated in face elevation by dotted lines in Fig. 1, until the edge of disc 8 engages the tapered wall at approximately the bottom of the cream chamber. When the separator has been initially placed in its full line unbent position, Fig. 1, downward pressure, on the handle rotates the disc (in the direction of the arrows) on its opposed points of contact 28 and 29 with the inclined wall adjacent to the bottom of the cream section, the handle bending at its juncture with the disc, and continued pressure will force the disc to its final wedged or seated position as shown in Fig. 3. Thus the functional relationship is such that the housewife, in separating the cream from the milk, merely inserts the device in the bottle, and responsive to a little pressure, the disc is automatically turned until its periphery wedges or seats on the internal surfaces of the flared or inverted frustro-conical wall of the cream section, preferably just above the approximate cream line.

It will be understood that the container is preferably so constructed that the cubical content of its cream section is approximately ⅕ that of the container, or sufficient to receive the cream that may rise to the surface from the volume of the milk in the milk section 2.

Thus when the separator is positioned as shown in Fig. 3, the milk section is effectively sealed from the cream section, and the cream may be poured off without escape of the milk.

The cream section 2, of Fig. 1 is somewhat different in form from the cream section 13 of Fig. 2 and it is not material to this invention what the cross-sectional form may be, except that it should have a tapered wall for engagement by the disc as the latter approaches its final position and a mouth of greater diameter than the disc so as to readily admit a separator. The functioning of the double bend separator is the same as for the single bend type, except that when the disc has reached its final wedged or seated position or thereabouts, the handle portion between the weakened sections folds or collapses on the disc.

The shape of the container may be varied as shown in Fig. 11 except for the provision of the inclined wall of the cream section 20 and the lower milk section 21 of less diameter than the opening 22 at the mouth of the container which is a feature common to all the forms. The container shown in Fig. 11 may be of any desirable material, as for instance, paper or metal, and the discharge opening 22 is provided with a shoulder 23 to receive a suitable bottle cap 36. The manipulation and functioning of all double bend separators for example those shown in Figs. 9, 10, and 11, remain substantially as or equivalent to that heretofore described and shown in Fig. 1, except that when the disc has reached its final wedged or seated position or thereabouts, the handle portion between the weakened sections folds or collapses on the disc.

In all cases where used with a container as shown, the separator disc, when being manipulated to a separating position by means of the handle, turns or pivots about a neutral axis on the surface of the inclined walls, so that the disc portion opposite the handle swings upwardly through an arc, while the side adjacent the handle swings and wedges downwardly through an arc to approximately a horizontal position, thereby causing the material of the disc, when constructed of paper or other fibrous material, when completely positioned to compress, wedging the disc between the wall.

It is to be noted that the connection between the separator disc and its handle, in each of the disclosed forms of the invention, is, in effect, a hinged connection.

From the foregoing description, it is believed evident that the essential characteristics of the invention are in the separator which will definitely bend only at predetermined locations under reasonable pressure, and in the combination of the container and separator. Said separator cooperatively functioning most efficiently with a cream section having inclined or flared walls whereby, under suitable downward pressure, the handle will bend at its weakened point or points, automatically wedging and thereby forming a hermetically sealed joint between the surfaces of an inverted cone-like wall or seating the disc to form a suitable joint on the internal surfaces of greater than a wedging taper, inverted cone-like or other form. Furthermore, it is inexpensive, simple, efficient, and practically fool-proof, besides being readily inserted and removed by the handle and when once pushed to operative position is self-retaining.

It will be understood that various changes may be made in the structure and form of the separator and container without departing from the spirit and scope of the invention as set forth in the annexed claims.

Having thus fully described my invention, its utility and mode of operation, what I claim and desire to procure by Letters Patent is—

1. A device of the class described for use in a milk bottle having a lower milk portion and an upper cream portion communicating through a throat restricted relative to the upper portion to receive a separator disk, comprising a separator disk and handle formed from sheet material with the handle and the disk lying in approximately the same plane, said disk being of a size to seat in the throat of the bottle in which it is used and the handle being of a cross sectional area to be sufficiently stiff to serve as a thrust member and having its cross sectional area reduced adjacent its point of juncture with the disk so that it is weakened to such an extent that when the device is introduced disk first into a milk bottle in which it is to be used with the disk edgewise to engage the throat at opposite points in edgewise position, a thrust on the handle after the disk is in engagement with opposite points on the throat will cause the device to bend adjacent the point of juncture of the disk and handle and will cause the disk to pivot about said portion of reduced cross sectional area to a closing position sealing the throat of the bottle.

2. A device of the class described for use in a milk bottle having a lower milk portion and an upper cream portion communicating through a throat restricted relative to the upper portion to receive a separator disk, comprising a separator disk and handle formed from sheet material with the handle and the disk lying in approximately the same plane, said disk being of a size to seat in the throat of the bottle in which it is used and the handle being of a cross sectional area to be sufficiently stiff to serve as a thrust member and tapering to its point of juncture with the disk to a cross sectional area reduced so that it is weakened to such an extent that when the device is introduced disk first into a milk bottle in which it is to be used with the disk edgewise to engage the throat at opposite points in edgewise position, a thrust on the handle after the disk is in engagement with opposite points on the throat will cause the device to bend adjacent the point of juncture of the disk and handle and will cause the disk to pivot about said portion of reduced cross sectional area to a closing position sealing the throat of the bottle.

3. A device of the class described for use in a milk bottle having a lower milk portion and an upper cream portion communicating through a throat restricted relative to the upper portion to receive a separator disk, comprising a separator disk and handle formed from sheet material with the handle and the disk lying in approximately the same plane, said disk being of a size to seat in the throat of the bottle in which it is used and the handle being of a cross sectional area to be sufficiently stiff to serve as a thrust member and being notched at its point of juncture to the disk to provide a cross sectional area reduced so that it is weakened to such an extent that when the device is introduced disk first into a milk bottle in which it is to be used with the disk edgewise to engage the throat at opposite points in edgewise position, a thrust on the handle after the disk is in engagement with opposite points on the throat will cause the device to bend adjacent the point of juncture of the disk and handle and will cause the disk to pivot about said portion of reduced cross sectional area to a closing position sealing the throat of the bottle.

4. A container having a mouth comprising a lower milk portion and an upper cream portion communicating through a restricted throat, and a separator disk formed of non-corrosive organic material adapted to be brought into operative separating position across the throat having a diameter slightly greater than the throat, the said disk having a handle joined integrally to one edge thereof by a bendable joint and extending substantially in the plane of the disk, thrust on the handle serving first to engage the disk with the throat and then to buckle the joint transversely of the plane of the disk and to rotate the disk into operative position.

5. A container comprising a lower milk portion and an upper cream portion and a restricted throat therebetween, the wall of the cream portion immediately above the milk portion being downwardly tapered, and an internal separator disk having a diameter somewhat greater than the smallest diameter of the tapered wall, the degree of taper of said tapered wall being such that the disk may be wedgingly engaged with the same, the disk having a handle hinged to one edge thereof and extending substantially in the plane of the disk whereby the disk and handle are insertable edgewise in the container, thrust on the handle causing the disk to first engage the throat in open position and then rotate about the hinge transversely of the plane of the disk into sealing position across the throat and transversely of the handle.

6. A container comprising a lower milk portion and an upper cream portion communicating through a throat restricted relative to the upper portion to receive a separator disk, the wall of the cream portion above the throat being downwardly tapered, and a separator disk having a diameter slightly greater than the throat, the disk having a handle joined to one edge thereof and extending substantially in the plane of the disk so that when the disk is introduced edgewise it will first engage the tapered walls at opposite points, said handle having a yieldable portion whereby further thrust on the handle after such engagement will cause the disk to pivot about said yieldable portion to closing position sealing the throat.

WILLIAM C. TEUNISZ.